Patented May 9, 1939

2,157,831

UNITED STATES PATENT OFFICE 2,157,831.

STABILIZED ANTISEPTIC CREAM

Michael G. Minaeff, Metuchen, and Ronald C. Hughes, Highland Park, N. J., assignors to Zonite Products Corporation, New York, N. Y., a corporation of Delaware No Drawing. Application August 17, 1937, Serial No. 159,488

4 Claims. (Cl. 167—63)

This invention relates to a stabilized antiseptic ointment or cream in that it will withstand crystallization and crumbling for long periods of time.

More specifically, the invention is concerned with the product of United States Patent No. 1,676,309, dated July 10, 1928, treated to increase its ability to withstand crystallization and crumbling.

An object of this invention is to incorporate in the basic product of that patent a stabilizing agent which does not react with the ingredients thereof and the presence of which stabilizes the cream or ointment without in any way undesirably affecting the properties thereof for its intended use.

These and other objects, as will appear from the following disclosure are secured by means of this invention.

This invention resides substantially in the product as defined in the claims.

For the purpose of fully understanding the nature of this invention, sufficient of the disclosure of the above mentioned patent will be included to adequately disclose the new product and the advantages thereof over the old.

Basically the products of this invention, cream or ointment, include water, a chlorine-yielding substance, a stearate, and an excess of stearic acid. From this it will be seen that the compound, generally speaking, comprises a fatty acid soap carrying a considerable excess of fatty acid. In addition, there is included a chlorine-yielding material the stability of which is not affected by admixture with the fatty acid soap. Stearic acid is a suitable fatty acid for the purpose which, in the presence of a suitable amount of water, saponifies to provide a suitable emollient base for the ointment. To attain the best consistency of the ointment it is desirable to partly saponify the stearic acid with caustic potash or caustic soda.

A number of chlorine-yielding organic compounds can be used, as for example, sodium paratoluenesulfonchloramide or an ortho derivative of the same compound.

These ingredients suitably mixed, as will be described below, form the basic antiseptic cream, the stability of which it is the object of this invention to improve. For accomplishing this purpose, it has been discovered that certain saturated higher fatty alcohols are suitable. It has been further discovered that these stabilizing agents are suitable for the purpose because they do not react with or are not attacked by the clorine of the basic antiseptic cream or ointment. If the stabilizing agent should react with the ingredients of the cream the antiseptic value thereof would be destroyed. The invention or discovery herein disclosed, therefore, consists in the use of saturated higher fatty alcohols which at one and the same time increase the stability of the cream by preventing crystallization and crumbling without destroying the antiseptic properties of the cream. The particular alcohols which are suitable are tetradecyl alcohol, hexadecyl alcohol, and octadecyl alcohol. The cream and ointment in the presence of these alcohols even in small amounts preserve for a long period of time their consistency and creamy appearance, while as without these stabilizing agents the cream or ointment will tend to crystallize and become grainy.

A satisfactory ointment in accordance with this invention is prepared by dissolving 72 grams of potassium hydroxide in 1700 grams of water previously heated to 85 degrees C., in a jacketed kettle of a Read mixer. The beater of the mixer started at slow speed and with agitation 490 grams of melted stearic acid slowly added to the alkaline solution. The temperature of the water jacket is so regulated that it requires 15 to 20 minutes for the temperature of the ointment mass to reach 70 degrees C. When the temperature of the mass reaches 70 degrees C. and while the mixer is still in motion at slow speed 24 grams of sodium paratoluenesulfonchloramide previously dissolved in 60–70 grams of water heated to 65 degrees C. are added. Mixing is continued but at a higher speed and the temperature regulated so that it requires about one hour for the mass to reach a temperature of 50 degrees C. 10 grams of hexadecyl alcohol are melted on a water bath and to the melted alcohol 19.2 grams of eucalyptol, 7.74 grams bornyl acetate and 1.6 grams of mentrol are added and thoroughly mixed. When the ointment mass reaches the above temperature (50 degrees C.) the above alcohol and flavoring oils are added.

The heat is turned off the water jacket but mixing is continued at the same speed. At a temperature of 36 degrees C. to 38 degrees C. the mass will stiffen and adhere to the sides of the kettle. As this occurs the temperature rises about 3 degrees C. to 4 degrees C., after which the mass solftens or thins down and the temperature slowly drops. Mixing is continued until the mass is smooth and uniform which usually occurs at a temperature of 36 to 38 degrees C.

when the ointment is finished and ready to pack in jars or tubes.

This stabilizing composition contains as Wright says in his patent, an available reserve of normally inactive alkali in the potassium stearate which tends to hydrolyze in solution, but, in this ointment, is prevented from so doing by the excess of stearic acid. The ointment contains an available reserve of acid which is normally inactive because it is very slightly soluble, the stearic acid being soluble in water to the extent of a fraction of one percent.

It is very essential, in accordance with this invention, that the stabilizing ingredient be a saturated compound. The unsaturated compounds are easily attacked by the chlorine in the cream and would therefore impair its efficiency. Saturated fatty higher alcohols of technical grade frequently contain some unsaturated compound, the quantity of which is expressed in terms of iodine numbers. The lower the iodine number the smaller is the quantity of unsaturated compound present. It is preferred that saturated fatty alcohols as well as the stearic acid of the formula have an iodine number of five or less and, where possible, even less than one.

The product in accordance with this invention has a greatly improved consistency and is highly stable even where it stands under normal temperature conditions for long periods of time.

To prepare a satisfactory cream in accordance with this invention, the above formula with the exception of the flavoring oils is used, but a slightly different mixing procedure is followed. 72 grams of potassium hydroxide are dissolved in 1700 grams of water previously heated to 85 degrees C., in a jacketed kettle of a Read mixer. The beater of the mixer started at low speed and with agitation 490 grams of melted stearic acid together with 10 grams of melted hexadecyl alcohol are slowly added to the alkaline solution. The temperature of the water jacket is regulated as in the previous example and when the temperature reaches 70 degrees C., 24 grams of sodium paratoluenesulfonchloramide previously dissolved in 60–70 grams of water heated to 65 degrees C. are added, mixing is continued but at a higher speed and the temperature regulated so that it requires about one hour for the mass to cool to 50 degrees C. When the temperature of the mass nears this point the heat is turned off and mixing continued using the same speed. At a temperature of 28–32 degrees C. the mass will become stiff, and adhere to the sides of the mixer and as this occurs the temperature will rise 3 or 4 degrees C., remaining at this temperature for several minutes until the mass is uniform, no dry or hard lumps present, during which time the temperature will drop to 28–30 degrees C. When the cream is uniform the mixing is stopped and the cream is ready for packing.

In the foregoing description the limits of ingredients can be varied considerably, for instance, we could set the limits as follows:

Water_____from 1200 to 1900 grams
Stearic acid_____from 450 to 600 grams
Sodium paratoluenesulfon-
  chloramide_____from 10 to 60 grams
Alcohol_____from 5 to 60 grams It will be apparent to those skilled in the art that the novel scope of this invention is not to be limited by the details herein given for purposes of providing an adequate disclosure of the nature and extent of the invention. We do not, therefore, desire to be limited except as required by the appended claims.

What we seek to secure by United States Letters Patent is:

1. A chemically and physically stable ointment or cream including an organic chlorine-yielding substance, an alkaline stearate, a substantial excess of stearic acid, and a saturated higher fatty alcohol selected from the group consisting of tetradecyl alcohol, hexadecyl alcohol and octadecyl alcohol, said alcohol being present in a proper proportion to prevent crystallization of the preparation.

2. A chemically and physically stable ointment or cream including an organic chlorine-yielding substance, an alkaline stearate, a substantial excess of stearic acid, and tetradecyl alcohol in sufficient quantity to prevent crystallization of the preparation.

3. A chemically and physically stable ointment or cream including an organic chlorine-yielding substance, an alkaline stearate, a substantial excess of stearic acid, and hexadecyl alcohol in sufficient quantity to prevent crystallization of the preparation.

4. A chemically and physically stable ointment or cream including an organic chlorine-yielding substance, an alkaline stearate, a substantial excess of stearic acid, and octadecyl alcohol in sufficient quantity to prevent crystallization of the preparation.

MICHAEL G. MINAEFF.
RONALD C. HUGHES.